March 31, 1959  C. B. SPASE  2,879,873
SPEED LIMITING TORQUE METERING VIBRATION DAMPENING CLUTCH
Filed Sept. 3, 1957  2 Sheets-Sheet 1

INVENTOR.
CHARLES B. SPASE
BY D. Emmett Thompson
Attorney

INVENTOR.
CHARLES B. SPASE
BY D. Emmett Thompson
Attorney

United States Patent Office 2,879,873
Patented Mar. 31, 1959

2,879,873

SPEED LIMITING TORQUE METERING VIBRATION DAMPENING CLUTCH

Charles B. Spase, Syracuse, N.Y., assignor to Lipe-Rollway Corporation, Syracuse, N.Y., a corporation of New York Application September 3, 1957, Serial No. 681,558

4 Claims. (Cl. 192—104)

This invention relates to a speed limiting and torque metering clutch of the type to be used in connection with automobile accessories, such as fans, compressors, generators, etc., wherein the speed and torque transmitted to such accessories must be limited to a predetermined maximum in order to prevent overloading and overspeeding the accessories.

Due to the fact that the automotive engines are of the multi-cylinder reciprocating type, the cylinder connection to the crank shaft transmits a non-uniform or interrupted flow of torque to the crank shaft which, in turn, creates torsional vibration in the crank shaft. This torsional vibration is objectionable, since it causes a faulty operation of these elements which take their operating torque from the crank shaft. Accordingly, it is an object of this invention to provide a speed and torque metering clutch which has an arrangement of parts to dampen such torsional vibration in order that a smoother, more nearly uniform torque may be delivered by the engine crank shaft.

The invention consists in the novel features and in the combinations and constructions hereinafter set forth and claimed.

In describing this invention, reference is had to the accompanying drawings in which like characters designate corresponding parts in all the views.

In the drawings—

Figure 1:
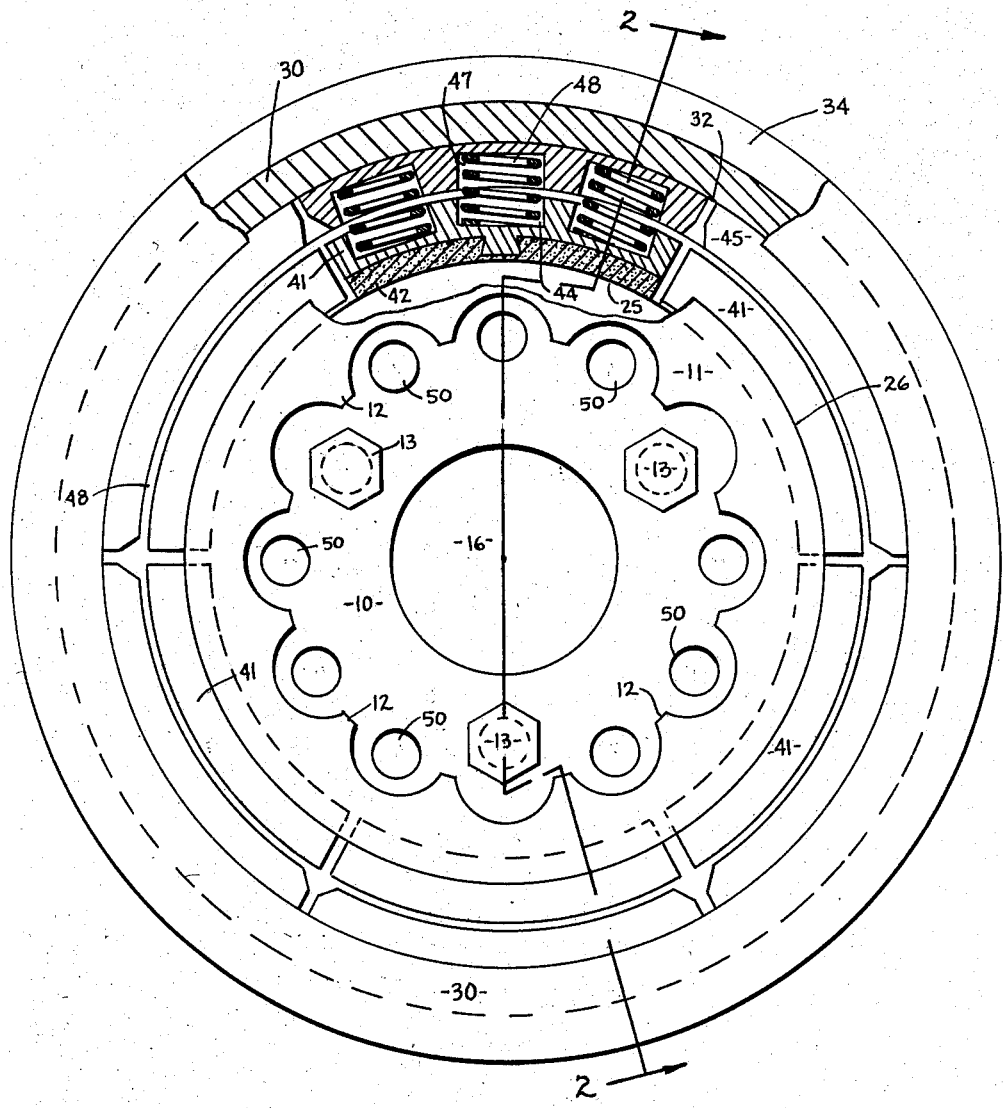
Figure 1 is a front elevational view of the invention shown partly broken away and partly in section.
Figure 2:
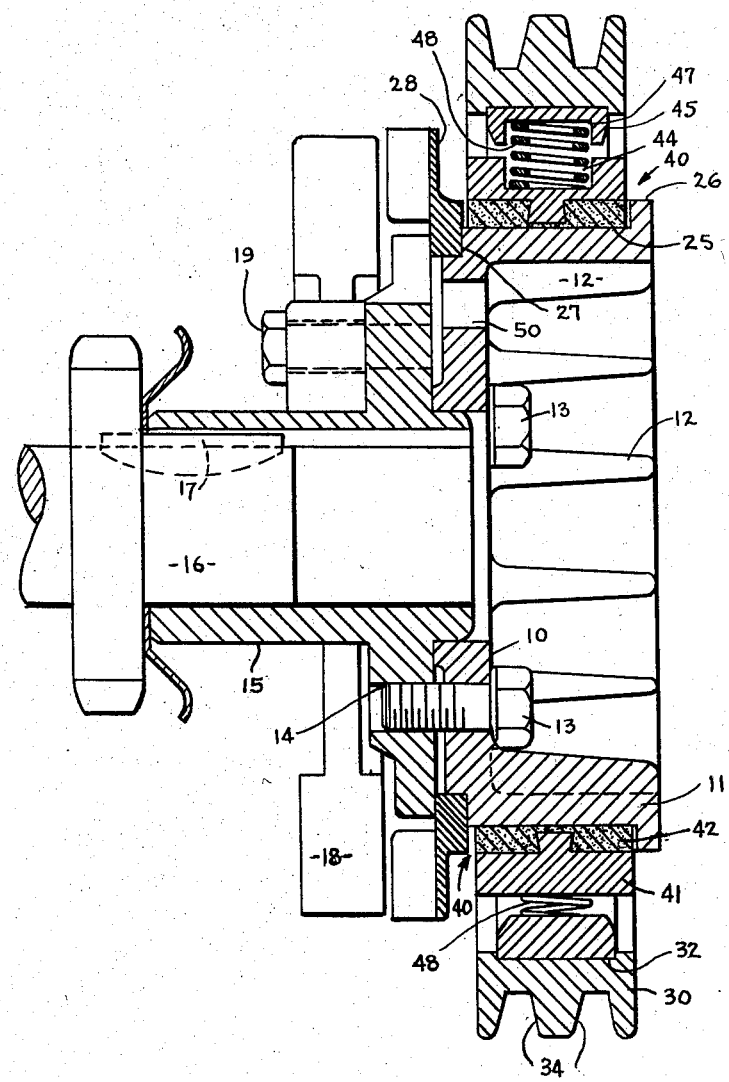
Figure 2 is a cross section taken on line 2—2 Figure 1.

The torque metering clutch is made up of a driving member having a discoidal portion 10 and a cylindrical flange 11 supported in part by ribs 12. A plurality of fasteners 13 extend through the discoidal portion 10 into threaded apertures 14 in the annular portion of sleeve 15. Sleeve 15 is connected to the crank shaft 16 by means of a key 17. A harmonic balancer 18 is mounted on the sleeve 15 by a plurality of fasteners 19.

The flange 11 of the driving member is formed with an external friction drum surface 25 which terminates in a radially outwardly extending lip 26. The inner edge of the drum surface 25 is formed with a reduced portion providing an annular notch 27 in which a fan 28 is mounted, for a purpose to be hereinafter described.

The driven member 30 is ring shaped and surrounds, in spaced concentric relation, the drum surface 25 of the driven member 10. The driven member is formed with an internal annular recess 32 to provide a friction surface, and a pair of external belt sheaves 34 for effecting a drive connection between the driven member 30 and the automotive accessories, such as fan, generator, oil pump, etc.

A circular series of suitable inner friction shoes, generally indicated at 40, engage the surface 25 of the driving member 10 and are positioned in the space between the driving and driven members. The shoes 40, as here shown, are formed of a metallic backing portion 41 surfaced with friction material 42.

The shoes 40 are formed with a plurality of radially inwardly extending recesses 44. Positioned in the annular recess 32 on the driven member 30 are a plurality of outer friction shoes 45 which engage the surface of the recess 32. The inner surfaces of the outer shoes 45 are formed with a plurality of radially extending recesses 47 which are in alignment and communicate with the recesses 44 in the inner shoes 40.

A plurality of coiled compression springs 48 are positioned in the recesses 44 and 47, between the inner shoes 40 and the outer shoes 45, and the springs urge the inner and outer shoes apart so as to provide a frictional driving engagement between the driving member 10 and the driven member 30 due to the fact that the inner shoes thus frictionally engage the drum surface 25 while the outer friction shoes frictionally engage the recessed surface 32 in the driven member 30.

When the rotational speed of the clutch reaches a certain predetermined speed, the centrifugal force acting upon the shoes 40 will cause the amount of frictional engagement the shoes 40 exert on the surface 25 to be decreased, thereby allowing slippage to take place between the shoes 40 and the surface 25 so as to meter or limit the speed of the driven member 30 and the torque transmitted to the driven member.

However, since a multi-cylinder engine of the reciprocating type delivers a non-uniform or interrupted torque to the crank shaft, torsional vibration is present in the crank shaft. This torsional virbation is dampened, so that a more uniform torque is transmitted from the crank shaft by the springs 48 and by reason of the fact that slippage may take place between the shoes 40 and the surface 25, and the shoes 45 and the surface 32.

The springs 48 dampen the torsional vibration because they are, in fact, the drive connectors between the inner shoes 40 and the outer shoes 45 and consequently, between the driving member 10 and the driven member 30. The springs absorb such vibration by bowing slightly in one direction whenever transmitted interrupted torque has a higher value than the combined inertia of the driven member 30 and the accessories connected thereto. At the same time, slippage also takes place between the inner and outer shoes 40, 45, and the surfaces 25, 32, the combined action action of the springs 48 bowing and the slippage at the surfaces 25 and 32 dampening the torsional vibration.

Conversely, whenever the value of the transmitted interrupted torque is lower than the combined inertia forces in the driven member and the accessories connected thereto, the springs 48 will bow slightly in the opposite direction, thus acting together with the slippage taking place at the surfaces 25 and 32 between the inner shoes 40 and the outer shoes 45, respectively, to absorb the torsional vibration.

The torque metering clutch thus cooperates with the harmonic balancer 18 which, per se, is old and well known and consequently forms no part of this invention, to dampen the torsional vibration in the crank shaft throughout the entire range of engine speeds so that the elements which take their operating torque from the crank shaft will function more efficiently at all engine speeds.

To dissipate the heat generated by the slippage of the shoes, especially the shoes 40, the discoidal portion 10 of the driving member is provided with a plurality of circumferentially spaced apart apertures 50 which communicate with the fan 28. Accordingly, when the driving member and fan 28 are rotated an air flow will be created past the annular flange 11 and through the apertures 50 to cool the driving member. At the same time, the rotation of the fan 28 will also create an air flow through the space between the driving and driven members to cool the inner and outer shoes 40, 45, and springs 48.

In addition, the fan 28 acts in cooperation with lip 26 to retain the shoes 40 on the surface 35 against axial displacement. Since the shoes 40 are connected to the shoes 45 by the springs 48, and because the shoes 45 are received in the recess 32 in the driven member, the driven member 30 will also be restrained from axial displacement.

It will thus be seen that the driven member 30 is freely mounted on the driving member which has a fixed center. Since the load demand of the accessories, which are connected to the driven member, is infinitely variable, the driven member is free to move relative to the axis of the driving member. That is to say, the center of the driven member may move with respect to the fixed center of the driving member in response to the varying load demands of the driven accessories. This movement, however, is limtited to a predetermined maximum by the radial distance or space between the inner and outer shoes 40, 45.

The free spring mounting of the driven member 30 is very important since it permits absorbtion of vibration within the clutch structure and allows the friction shoes to cool during each half cycle of rotation of the driven member. For example, as the accessory load demand increases, the driven sheave tends to climb upwardly in the belt, thus effecting greater compression of springs 28 associated with the shoes when positioned at the under or lower portion of the driving drum 11. As the shoes 40 move upwardly, the compression of the springs is less with correspondingly less frictional engagement between the shoes and drum 11, thereby imparting less heat to the shoes while moving through the upper portion of their circular path and permitting them to cool to a certain extent.

What I claim is:

1. A speed limiting, torque metering vibration dampening clutch comprising a driving member formed with a friction drum surface, a driven member encircling said drum in spaced relation thereto to thereby define a generally annular space therebetween, and means in said space supporting said driven member on said driving member, said means constituting the sole support for said driven member and comprising a circular series of friction shoes engaging said friction drum surface and a circular series of springs interposed between said friction shoes and said driven member.

2. A speed limiting, torque metering vibration dampening clutch comprising a driving member formed with a friction drum surface, a driven member encircling said drum in spaced relation thereto to thereby define a generally annular space therebetween, and means in said space supporting said driven member on said driving member, said means constituting the sole support for said driven member and comprising a circular series of inner friction shoes engaging said friction drum surface, a circular series of outer friction shoes spaced outwardly of said inner friction shoes and engaging said driven member, and springs urging said inner and outer shoes away from each other and into engagement with said drum surface and said driven member.

3. The clutch of claim 2 wherein the confronting surfaces of said inner and outer friction shoes have recesses therein, said recesses being radially aligned, and said springs are coil compression springs having their ends in said recesses.

4. The clutch of claim 2 wherein said drum surface and said driven member have means thereon to limit axial movement of said shoes.

References Cited in the file of this patent

UNITED STATES PATENTS

| | | |
|---|---|---|
| 2,031,319 | Kahn | Feb. 18, 1936 |
| 2,761,547 | Gehrer | Sept. 4, 1956 |

FOREIGN PATENTS

| | | |
|---|---|---|
| 496,800 | Great Britain | Dec. 6, 1938 |
| 963,346 | France | Dec. 26, 1949 |
| 508,163 | Belgium | June 15, 1952 |